United States Patent
Nakagawa et al.

(10) Patent No.: US 7,668,719 B2
(45) Date of Patent: Feb. 23, 2010

(54) SPEECH RECOGNITION METHOD AND SPEECH RECOGNITION APPARATUS

(75) Inventors: Kenichiro Nakagawa, Kawasaki (JP); Makoto Hirota, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 719 days.

(21) Appl. No.: 11/472,908

(22) Filed: Jun. 22, 2006

(65) Prior Publication Data
US 2007/0005371 A1 Jan. 4, 2007

(30) Foreign Application Priority Data
Jun. 30, 2005 (JP) .............................. 2005-191538

(51) Int. Cl.
G10L 11/00 (2006.01)
G10L 15/18 (2006.01)
G06F 3/16 (2006.01)

(52) U.S. Cl. .................... 704/270; 704/257; 715/727
(58) Field of Classification Search ............. None
See application file for complete search history.

(56) References Cited

U.S. PATENT DOCUMENTS

| 5,664,061 | A | * | 9/1997 | Andreshak et al. | .......... 704/275 |
| 5,890,122 | A | | 3/1999 | Van Kleeck et al. | |
| 5,897,618 | A | * | 4/1999 | Loats et al. | .......... 704/275 |
| 5,974,384 | A | * | 10/1999 | Yasuda | .......... 704/275 |
| 6,182,046 | B1 | | 1/2001 | Ortega et al. | |
| 6,587,820 | B2 | * | 7/2003 | Kosaka et al. | .......... 704/257 |
| 7,076,425 | B2 | * | 7/2006 | Ono et al. | .......... 704/252 |
| 2002/0062213 | A1 | | 5/2002 | Kosaka et al. | |

FOREIGN PATENT DOCUMENTS

| JP | 2003-202890 A | 7/2003 |
| KR | 2001-0073105 | 7/2001 |
| KR | 2005-0015585 | 2/2005 |
| WO | 0021073 A1 | 4/2000 |
| WO | 0231643 A1 | 4/2002 |

* cited by examiner

Primary Examiner—David R Hudspeth
Assistant Examiner—Brian L Albertalli
(74) Attorney, Agent, or Firm—Canon U.S.A., Inc. I.P. Division

(57) ABSTRACT

In an interactive process using speech recognition together with a graphical user interface comprising a plurality of settable graphical user interface items, the recognition rate is improved by reducing recognition target vocabulary. A settable graphical user interface item not displayed on the display screen is detected, and the received speech information is recognized using a speech recognition grammar corresponding to the detected item, and data is set to the item using the recognition result.

13 Claims, 9 Drawing Sheets

FIG.7

| GUI COMPONENT NAME | SPEECH RECOGNITION GRAMMAR NAME |
|---|---|
| TEXT AREA 1 | PaperNumber.xml |
| TEXT AREA 2 | PaperSize.xml |
| TEXT AREA 3 | CopyRatio.xml |
| TEXT AREA 4 | Dansity.xml |

SPEECH RECOGNITION METHOD AND SPEECH RECOGNITION APPARATUS

BACKGROUND OF THE INVENTION

1. Field of the Invention

The present invention relates to a speech recognition apparatus which recognizes input speech using speech recognition grammar.

2. Description of the Related Art

Speech is a natural interface for human beings, and in particular, it is an effective user interface (UI) for users such as children or elderly people who are not familiar with operating devices, or for the visually disabled. Recently, a data inputting method which combines this speech UI and GUI (Graphical User Interface) is drawing attention, and has been talked about in the W3C Multimodal Interaction Activity (http://www.w3.org/2002/mmi) or in the SALT Forum (http://www.saltforum.org/).

In general, data input by speech uses a conventional speech recognition technology. This speech recognition is a process in which the input speech and the recognition target vocabulary described within the speech recognition grammar are compared, and the vocabulary that fits best is outputted as the recognition result. However, by this method, the recognition performance deteriorates if the scale or the vocabulary size of the speech recognition grammar increases. In order to prevent such a problem, WO02/031643 discusses a technology in which speech recognition is conducted by detecting the input item presently displayed for the user on the GUI and using the speech recognition grammar corresponding to the item. As a result, the size of the recognition target vocabulary used in the speech recognition can be limited, and the deterioration of the speech recognition performance can be prevented.

In a system including a speech UI, the user is often asked to start speaking after pushing a specific key (which is referred to as a Push To Talk key). Such a method is advantageous in that the speech segment can be easily detected, and deterioration of the speech recognition performance can be reduced even in a noisy environment. There exists prior art in which a plurality of Push To Talk keys are provided, and each key has a specific meaning. For example, Japanese Patent Application Laid-Open No. 2003-202890 discusses a technology in which a set of speech recognition grammar to be used is switched in accordance with the Push To Talk key that is manipulated. As a result, the user is able to select the set of speech recognition grammar to be used, as well as give information about the start of speech, by depressing the key.

As described above, according to the prior art (WO02/031643), the recognition vocabulary used in the speech recognition can be reduced. However, while the speech can be input into an input target within the displayed area on the GUI according to WO02/031643, speech input onto the input target which is not displayed, is not considered. For example, users who are used to operating the system may want to input items into the input target not being displayed. However, it is difficult to respond to such a demand.

As described above, Japanese Patent Application Laid Open No. 2003-202890 is prior art using a plurality of Push To Talk keys. However, these keys do not switch the speech recognition grammar in accordance with change of the display.

SUMMARY OF THE INVENTION

In light of the aforementioned, and according to an aspect of the present invention, an information processing method is provided for setting data to each of a plurality of settable graphical user interface items. The method includes detecting a settable graphical user interface item not displayed on a display screen; selecting a speech recognition grammar corresponding to the detected item; recognizing received speech information using the selected speech recognition grammar; and setting data to the detected item using a recognition result of the recognizing step.

According to another aspect of the present invention, the selected speech recognition grammar is speech recognition grammar which is limited to a subset of the speech recognition grammar used in a case where the item is displayed. According to another aspect of the present invention, the setting step sets data to the detected item by inputting the recognition result into an input field corresponding to the detected item.

According to another aspect of the present invention, the setting step sets data to the detected item by selecting from objects to be selected that correspond to the detected item using the recognition result. And according to another aspect of the present invention, the selecting step selects a speech recognition grammar corresponding to a settable graphical user interface item displayed on a display screen, and wherein the recognizing step recognizes received speech information using a limited speech recognition grammar corresponding to the settable graphical user interface item not displayed and a speech recognition grammar corresponding to the displayed settable graphical user interface item.

According to still yet another aspect of the present invention, the speech recognition grammar includes a recognition vocabulary corresponding to the detected settable graphical user interface item and a recognition vocabulary corresponding to data to be set to the detected item, and the limited speech recognition grammar is a speech recognition grammar in which a recognition grammar corresponding to data to be set to the settable graphical user interface item has been precluded from a recognition target. And additionally, according to yet another aspect of the present invention, the limited speech recognition grammar is a speech recognition grammar in which a specific vocabulary set has been deleted.

Moreover, according to another aspect of the present invention, an information processing method is provided for setting data to each of a plurality of settable graphical user interface items. Here, the method includes recognizing received speech information using speech recognition grammar corresponding to a settable graphical user interface item which is not displayed in a case where an instruction from an instruction unit which instructs to start speech recognition makes a settable graphical user interface item not displayed on a display screen effective; and setting the settable graphical user interface item using a recognition result of the recognizing step.

Furthermore, according to another aspect of the present invention, the speech recognition grammar corresponding to the settable graphical user interface item which is not displayed is speech recognition grammar which is limited to a subset of the speech recognition grammar used in a case where the settable graphical user interface item is displayed. And another aspect of the present invention includes wherein the recognizing step recognizes received speech information using speech recognition grammar corresponding to a settable graphical user interface item which is displayed, in the case where an instruction from the instruction unit which instructs to start speech recognition, makes a settable graphical user interface item that is displayed on a display screen effective.

While according to another aspect of the present invention, the instruction unit which instructs to start speech recognition is a button, and wherein there are at least two buttons, one of which makes a settable graphical user interface item displayed on a display screen effective, and another of which makes a settable graphical user interface item which is not displayed on a display screen effective. And, according to another aspect of the present invention, the instruction unit which instructs to start speech recognition is at least one of an instruction unit which instructs to start speech recognition upon detecting speech, and an instruction unit which instructs to start speech recognition upon detecting depression of a button.

Further, according to another aspect of the present invention, an information processing method is provided which includes detecting a settable graphical user interface item not displayed on a display screen; recognizing received speech information after precluding recognition vocabulary corresponding to the detected settable graphical user interface item as non-recognition target from speech recognition grammar that has one-to-one correspondence with each settable graphical user interface item and includes a recognition vocabulary corresponding to the item and data to be set to the item; and performing control to display the item in a case where the recognition result of the recognizing step is a recognition vocabulary corresponding to an item that is not displayed.

According to another aspect of the present invention, a computer readable medium is provided which contains computer-executable instructions for setting data to each of a plurality of settable graphical user interface items. The medium includes computer-executable instructions for detecting a settable graphical user interface item not displayed on a display screen; computer-executable instructions for selecting a speech recognition grammar corresponding to the detected item; computer-executable instructions for recognizing received speech information using the selected speech recognition grammar; and computer-executable instructions for setting data to the detected item using a recognition result of the recognizing step.

According to another aspect of the present invention, a computer readable medium is provided which contains computer-executable instructions for setting data to each of a plurality of settable graphical user interface items. The medium includes computer-executable instructions for recognizing received speech information using speech recognition grammar corresponding to a settable graphical user interface item which is not displayed in a case where an instruction from an instruction unit which instructs to start speech recognition makes a settable graphical user interface item not displayed on a display screen effective; and computer-executable instructions for setting the settable graphical user interface item using a recognition result of the recognizing step.

Moreover, according to another aspect of the present invention, a computer readable medium is provided which contains computer-executable instructions for implementing processing control. The medium includes computer-executable instructions for detecting a settable graphical user interface item not displayed on a display screen; computer-executable instructions for recognizing received speech information after precluding recognition vocabulary corresponding to the detected settable graphical user interface item as non-recognition target from speech recognition grammar that has one-to-one correspondence with each settable graphical user interface item and includes a recognition vocabulary corresponding to the item and data to be set to the item; and computer-executable instructions for performing control to display the item in a case where the recognition result of the recognizing step is a recognition vocabulary corresponding to an item that is not displayed.

According to another aspect of the present invention, an information processing apparatus is provided which is configured to set data to each of a plurality of settable graphical user interface items. The apparatus includes a detecting unit configured to detect a settable graphical user interface item not displayed on a display screen; a selecting unit configured to select speech recognition grammar corresponding to the item detected by the detecting unit; a recognizing unit configured to recognize received speech information using the selected speech recognition grammar; and a setting unit configured to set data to the detected item using a recognition result from the recognizing unit.

Still further, according to another aspect of the present invention, an information processing apparatus is provided configured to set data to each of a plurality of settable graphical user interface item. The apparatus includes a detecting unit configured to detect a settable graphical user interface item not displayed on a display screen; a recognizing unit configured to recognize received speech information using a speech recognition grammar corresponding to a settable graphical user interface item which is not displayed in a case where an instruction from an instruction unit which instructs to start a speech recognition makes a settable graphical user interface item not displayed on a display screen effective; and a setting unit configured to set the detected item using a recognition result obtained by the recognizing unit.

And finally, according to another aspect of the present invention, an information processing apparatus is provided which includes a detecting unit configured to detect a settable graphical user interface item not displayed on a display screen; a recognizing unit configured to recognize received speech information after precluding recognition vocabulary corresponding to the data for the detected item as non-recognition target from a speech recognition grammar that has one-to-one correspondence with each settable graphical user interface item and includes a recognition vocabulary corresponding to the settable graphical user interface item and data to be set to the item; and a display controlling unit configured to perform control to display a settable graphical user interface item not displayed in the case where a recognition result obtained by the recognizing unit is a recognition vocabulary corresponding to the settable graphical user interface item not displayed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the invention.

FIG. 7 is an example of a table showing relation between the GUI component name and the speech recognition grammar name of an information processing apparatus in the exemplary embodiment.

DETAILED DESCRIPTION OF THE EXEMPLARY EMBODIMENTS

Numerous exemplary embodiments, features and aspects of the present invention will be described in detail below with reference to the drawings.

First Exemplary Embodiment

Figure 1:
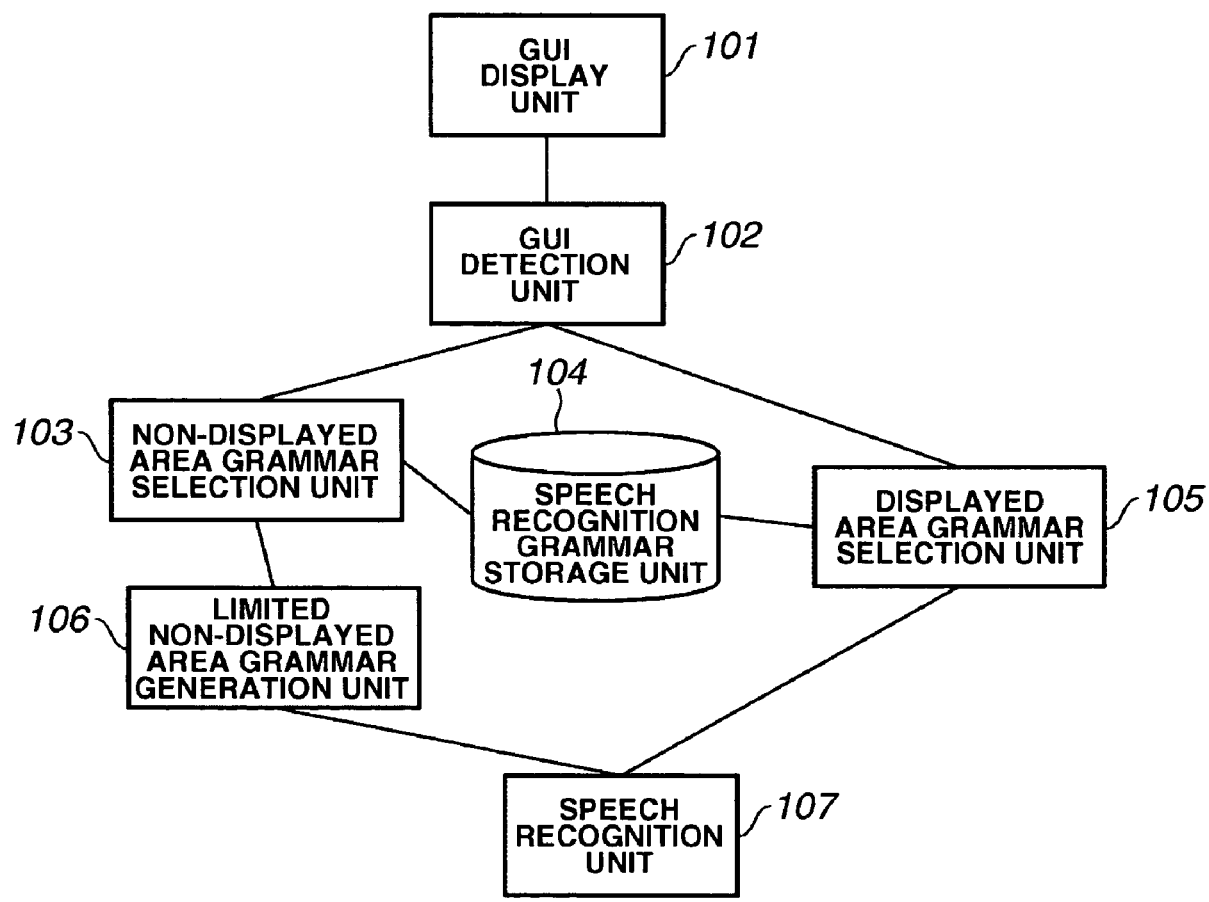
FIG. 1 is a diagram showing an example functional configuration of an information processing apparatus according to the first exemplary embodiment of the present invention.
Figure 2:
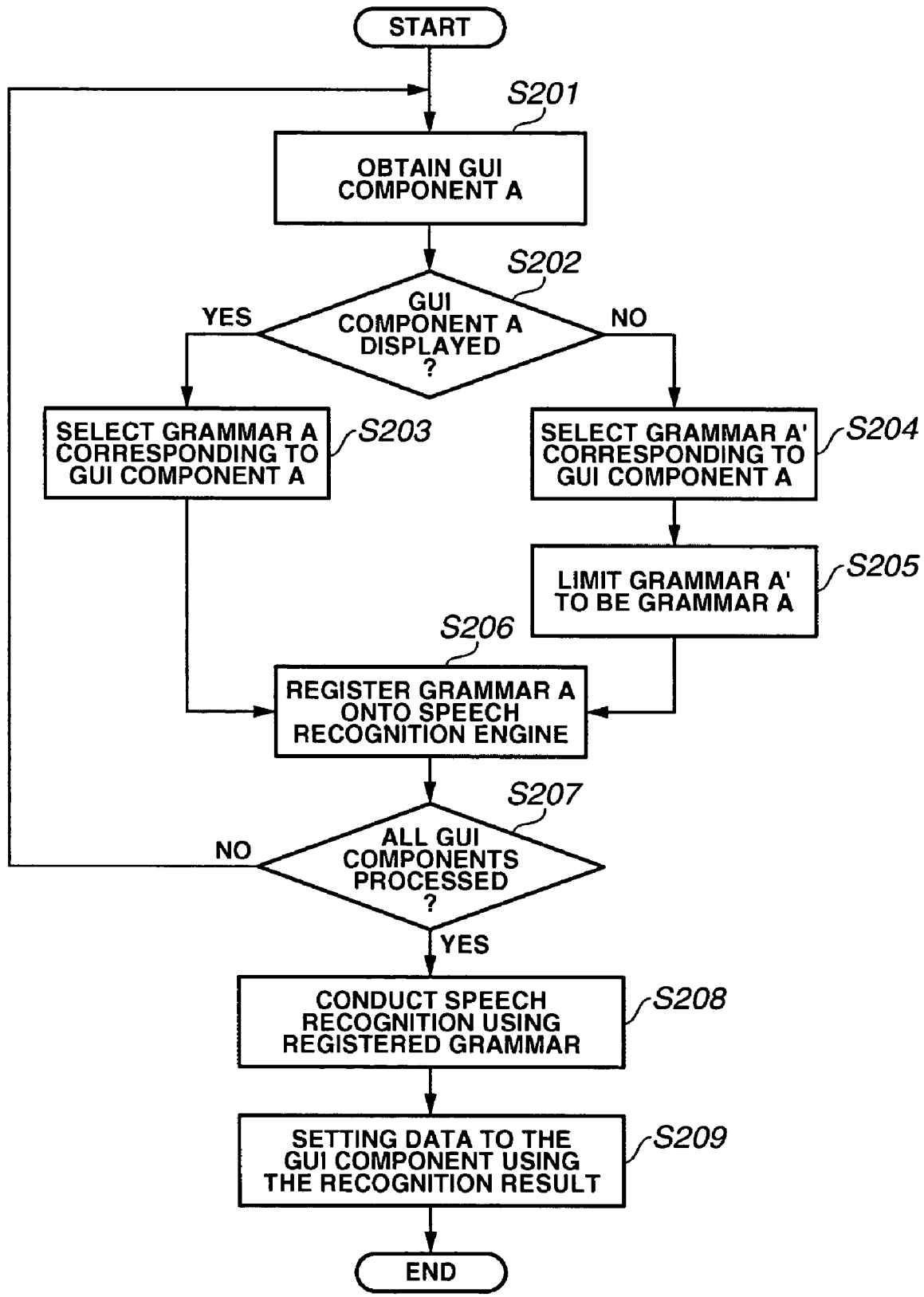
FIG. 2 is an example process flow of an information processing apparatus according to the first exemplary embodiment.
Figure 5:
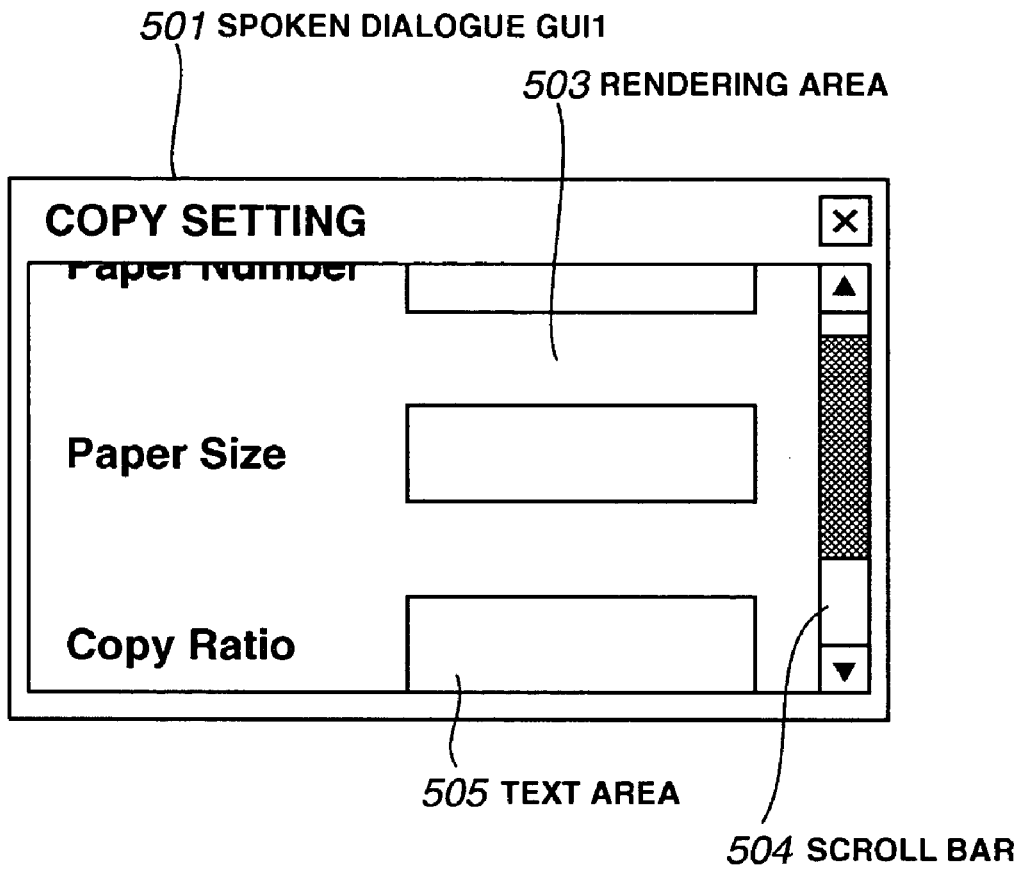
FIG. 5 is an example of a GUI screen of an information processing apparatus according to an exemplary embodiment of the present invention.
Figure 5:
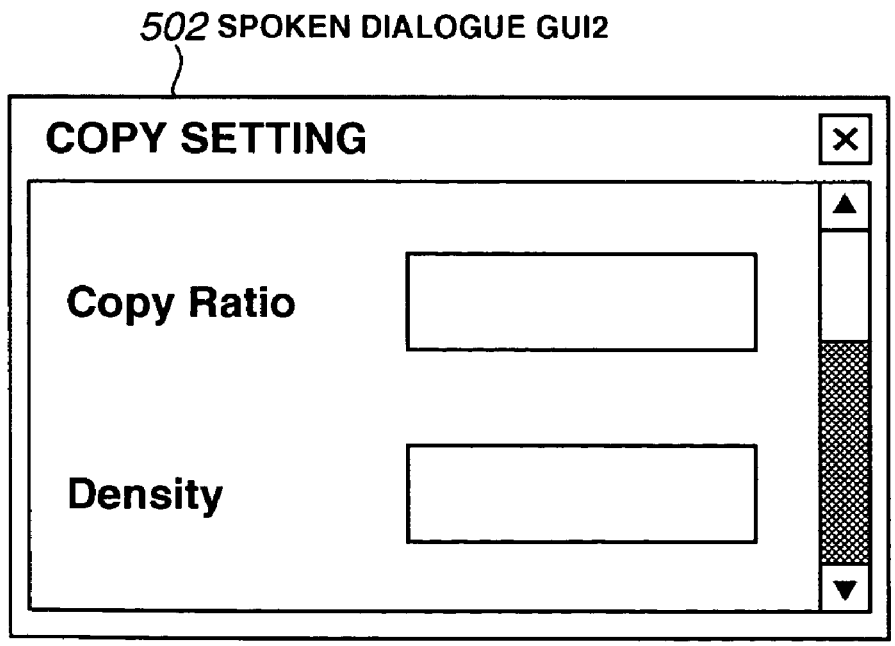

FIG. 1 shows the functional configuration of an information processing apparatus according to the first exemplary embodiment of the present invention. FIG. 2 is the process flow of the information processing apparatus. FIG. 5 shows an example of the GUI portion of the apparatus. The first exemplary embodiment will be described with reference to these drawings. In this exemplary embodiment, a copying machine in which setting is made using a speech UI and GUI, will be taken as an example.

Now referring to FIG. 1, the information processing apparatus according to the first exemplary embodiment of the present invention includes a GUI display unit 101, GUI detection unit 102, non-displayed area grammar selection unit 103, speech recognition grammar storage unit 104, displayed area grammar selection unit 105, limited non-displayed area grammar generation unit 106 and a speech recognition unit 107.

The GUI display unit 101 may be, for example, a display or a touch panel. An example of a GUI screen is shown in FIG. 5 which includes a spoken dialogue GUI1 501 and another spoken dialogue GUI2 502. Each GUI includes a rendering area 503, scroll bar 504 and text area 505. Due to the limitations of the GUI display device size, not all of the information may be displayed at once in the apparatus. In such a case, the user can change the display area by sliding the scroll bar 504 up and down as shown in the reference numerals 501 and 502 of FIG. 5.

When a specific event such as a start of the speech input mode occurs, the process of the present exemplary embodiment is started and proceeds to the flow in FIG. 2. The flow will be described assuming that the GUI screen at this stage is in the state of the reference numeral 501.

Now referring to FIG. 2, first, a GUI detecting unit 102 (see FIG. 1) obtains a GUI component currently being rendered (S201 from FIG. 2). Hereinafter, words, "render" and "display", will be used separately. To "render" means to lay out the view data of the GUI component on the memory (such as a VRAM) of the output device. To "display" means to output onto a display in a form that can be visually seen by the user.

Figure 8:
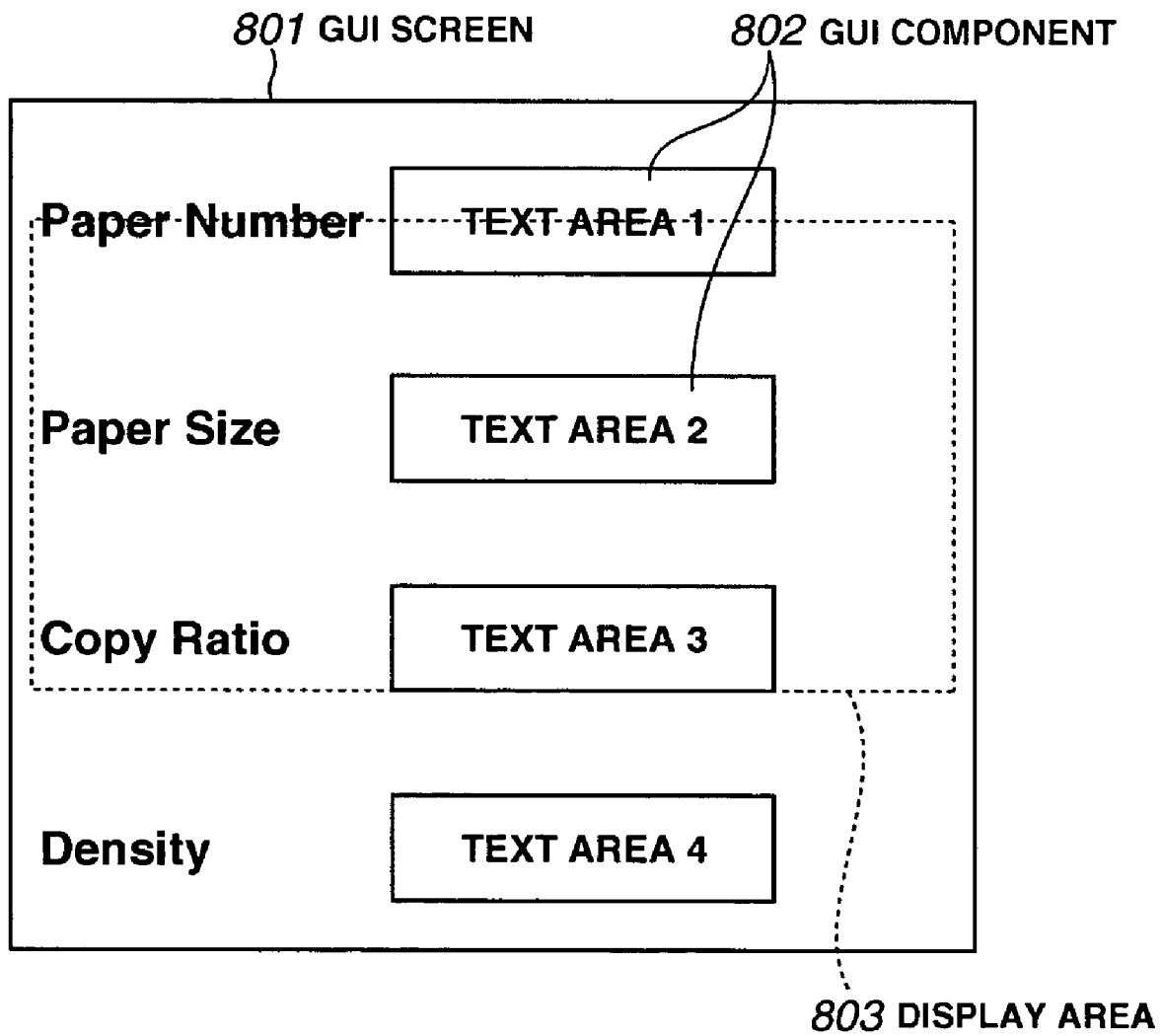
FIG. 8 is a diagram showing the relationship between the GUI screen and the GUI display area.

The GUI component obtained by the GUI detecting unit 102 will be referred to as the GUI component A. A GUI component is an element configuring the GUI, such as a button, text box, list box, and it represents an item to be set. Next, it is determined whether the obtained GUI component is currently being displayed, and the GUI component that is displayed and the GUI component that is not displayed are detected (S202). The determination whether the component is displayed can be made by referring to the position of the GUI component, the size of the GUI screen, or the state of the scroll bar. For example, the relation between the GUI screen and the actual display area when the GUI screen is in the state of the reference numeral 501, is shown in FIG. 8 which shows a GUI screen 801, GUI components 802, and display area 803. When a "displayed" GUI component is defined as a GUI component that is completely visible, the displayed GUI components at this time are only text area 2 corresponding to "Paper Size" and text area 3 corresponding to "Copy Ratio".

Now referring back to FIG. 2, after determining that the GUI component A is displayed, the displayed area grammar selecting unit 105 (from FIG. 1) accesses the speech recognition grammar storage unit 104 (from FIG. 1), and the speech recognition grammar corresponding to the GUI component A is selected and obtained. The obtained grammar is then referred to as grammar A (step S203). A table showing the relation between the GUI component name and the speech recognition grammar name may be used to select the speech recognition grammar corresponding to the GUI component. FIG. 7 is an example of such table. For example, in the case where the GUI component A is the text area 2, the speech recognition grammar name is PaperSize.xml.

On the other hand, in the case where it is determined that the GUI component A is not displayed, the non-displayed area grammar selecting unit 103 accesses the speech recognition grammar storage unit 104, and the speech recognition grammar corresponding to the GUI component A is selected and obtained. The obtained grammar is then referred to as grammar A' (S204). The table showing the relation between the GUI component name and the speech recognition grammar name as shown in FIG. 7 can also be used in this case. The selected speech recognition grammar A' is sent to the limited non-displayed area grammar generating unit 106. The content of the speech recognition grammar A' is analyzed, and speech recognition grammar A is generated limiting the vocabulary in the speech recognition grammar A' (S205). In other words the grammar A has a smaller vocabulary than grammar A'. This speech recognition grammar in which the vocabulary is limited may be generated beforehand.

Figure 6:
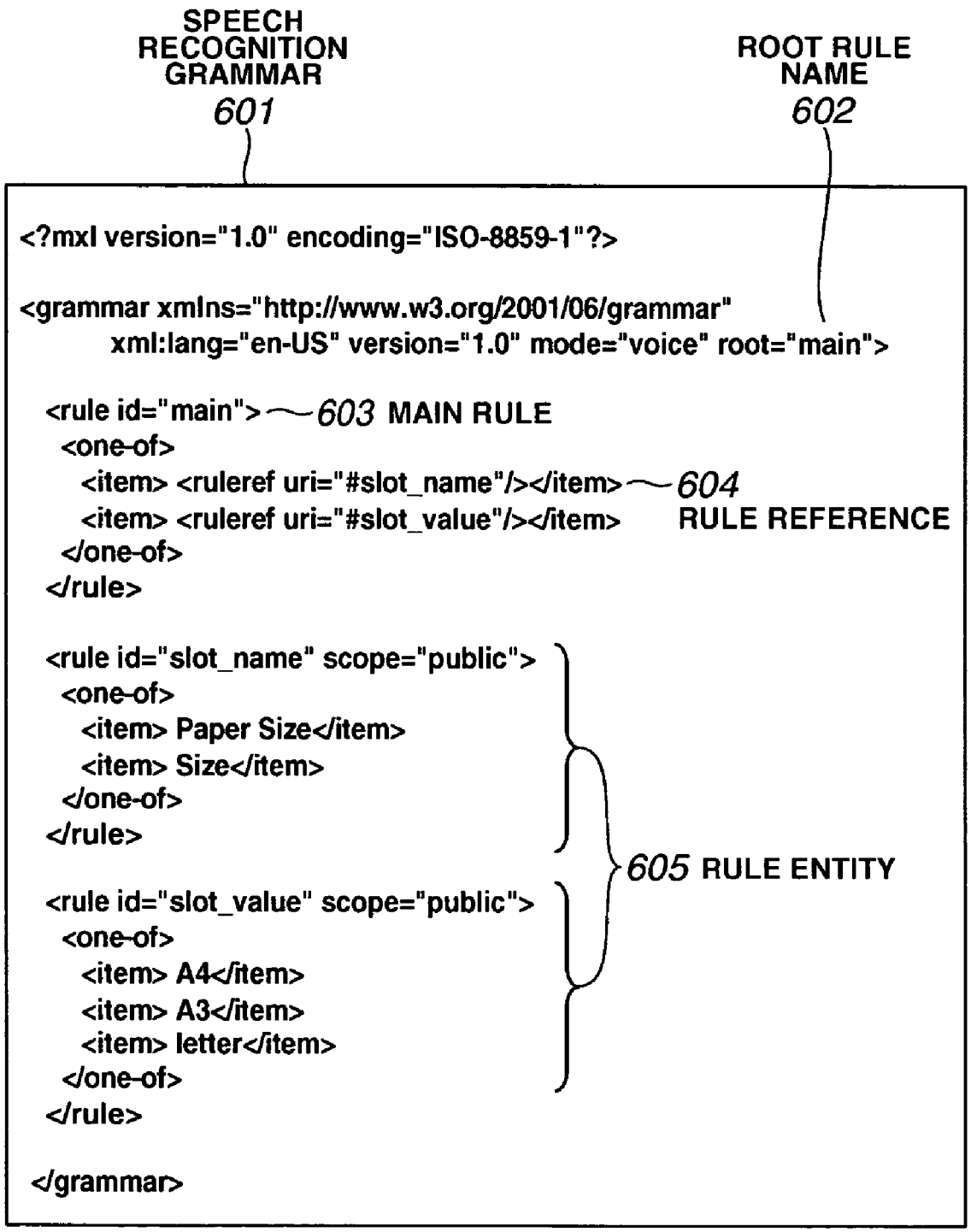
FIG. 6 is an example of a speech recognition grammar used in the exemplary embodiment.

The limiting of the vocabulary within the grammar is explained using the grammar shown in FIG. 6. This speech recognition grammar accepts the size of the copying paper such as "A4", and "A3", and it is described with the language specification of the Speech Recognition Grammar Specification Version 1.0 (http://www.w3.org/TR/speech-grammar/). The root rule name 602 of this speech recognition grammar 601 is "main" rule (602). Consequently, when the speech recognition grammar is analyzed by a general method, the rule with the name "main" (603) is deployed first. In the main rule, a reference is made to the two rules, "slot_name" and "slot_value" (604). "Slot_name" is a vocabulary set corresponding to the name of the item to be set (the type of setting), and "slot_value" is a vocabulary set corresponding to the value of the item (the actual data to be input in the item to be set). The entities of these two rules are described in 605.

That is, by conducting analysis with the speech recognition grammar intact, the "slot_name" and "slot_value" rules are deployed, and item names such as "Paper Size" and item values such as "A4" and "A3" can be recognized. However, by limiting the rule to be deployed, to "slot_name", only the item names such as "Paper Size" and "Size" will be accepted. Thus the vocabulary is limited to a subset of that available when the settable GUI component is actually displayed.

In the example of reference numeral 501, since the text area 1 and the text area 4 of the GUI component are considered to be not displayed, "PaperNumber.xml" and "Density.xml" are selected as the non-displayed area grammar (or the speech recognition grammar A') from FIG. 7. In addition, the rule to be deployed for these two sets of grammar is limited to "slot_name" so that only the item name can be accepted. The limited grammar will be referred to as the speech recognition grammar A.

Now referring back to FIG. 2, the speech recognition grammar A corresponding to GUI component A is sent to the speech recognition unit 107 and registered onto the speech recognition engine (S206). Next, it is determined whether all of the GUI components have been processed (S207). If it is confirmed that all of the GUI components have been processed (YES at S208), speech recognition is conducted using the registered grammar (S208). Otherwise, if not all of the GUI components have been processed, then process returns to step S201 (NO at S208). Thereafter, data is set to the GUI component using the recognition result (S209). Then the process ends.

In the example of reference numeral 501 (see FIG. 5), "PaperSize.xml" and "CopyRatio.xml" are registered onto the speech recognition engine as they are, whereas "PaperNumber.xml" and "Density.xml" are limited so that only the item name can be spoken, and are registered. Therefore, the user can input by speech the item values of the "Paper Size" and "Copy Ratio" (such as "A4" and "400%"), the item name" (such as "Paper Size" and "Copy Ratio"), and the item names of "Paper Number" and "Density" (such as "Paper Number" and "Density"). The item values of "Paper Number" and "Density" will not be recognized even if it is spoken.

The above describes the operation of the apparatus according to the first exemplary embodiment. By using this apparatus, the following application can be realized. In the case where an item value is output as a result of the speech recognition, the result is input to the corresponding text area. This therefore provides a setting unit for setting the data.

For example, in the case where a recognition result "A4" is output in the state of reference numeral 501, a character string "A4" is input to the text area of Paper Size. In the case where an item name such as "Density" is output as a recognition result, control is performed to display the area corresponding to the item name. To be more precise, the screen is scrolled to the area corresponding to the item name. For example, the screen is scrolled as shown in the reference numeral 502. In general, the user does not utter a value of an item not displayed on the GUI. For this reason, it is assumed that the usability will not deteriorate even if the item value of the item that is not displayed is removed from the recognition vocabulary. On the contrary, the recognition performance can be improved due to the reduction in the recognition vocabulary.

Second Exemplary Embodiment

A plurality of speech recognition triggers can be further combined with the first exemplary embodiment. An interactive apparatus which utilizes speech input often imposes depression of a specific key on a user at the time of starting speech. This is to improve the accuracy of the speech segment detection process, which is a preprocessing part of the speech recognition. Hereinafter, this key is referred to as a Push To Talk key. The usability of an apparatus can be improved by providing a plurality of these Push To Talk keys and have the user depress them accordingly. This embodiment will be described with reference to FIG. 3 and FIG. 4. It is noted that the components in FIG. 3 that are the same as in FIG. 1 are allocated the same reference numerals.

Figure 3:
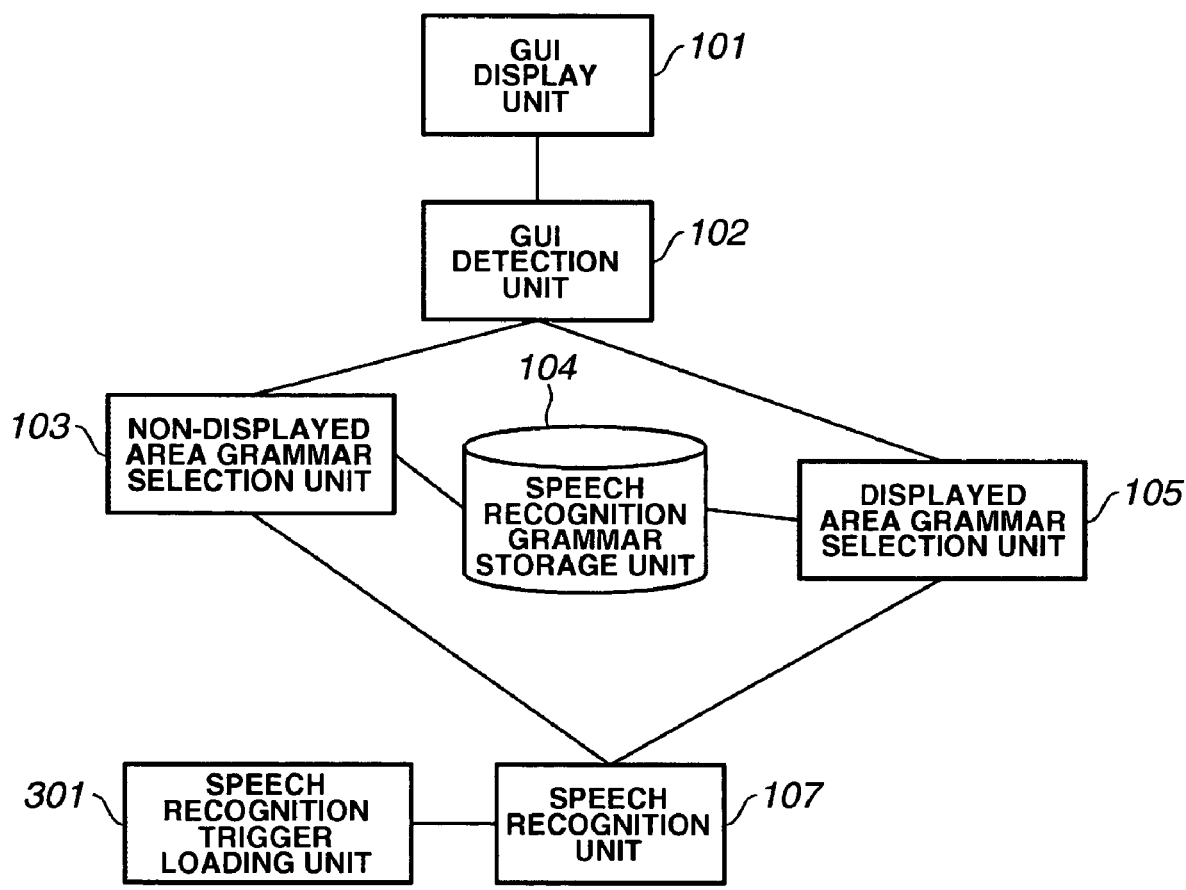
FIG. 3 is a diagram showing an example functional configuration of an information processing apparatus according to the second exemplary embodiment of the present invention.

Now referring to FIG. 3, the information processing apparatus according to the second exemplary embodiment of the present invention includes a GUI display unit 101, GUI detection unit 102, non-displayed area grammar selection unit 103, speech recognition grammar storage unit 104, displayed area grammar selection unit 105, a speech recognition unit 107, and a speech recognition trigger loading unit.

Figure 4:
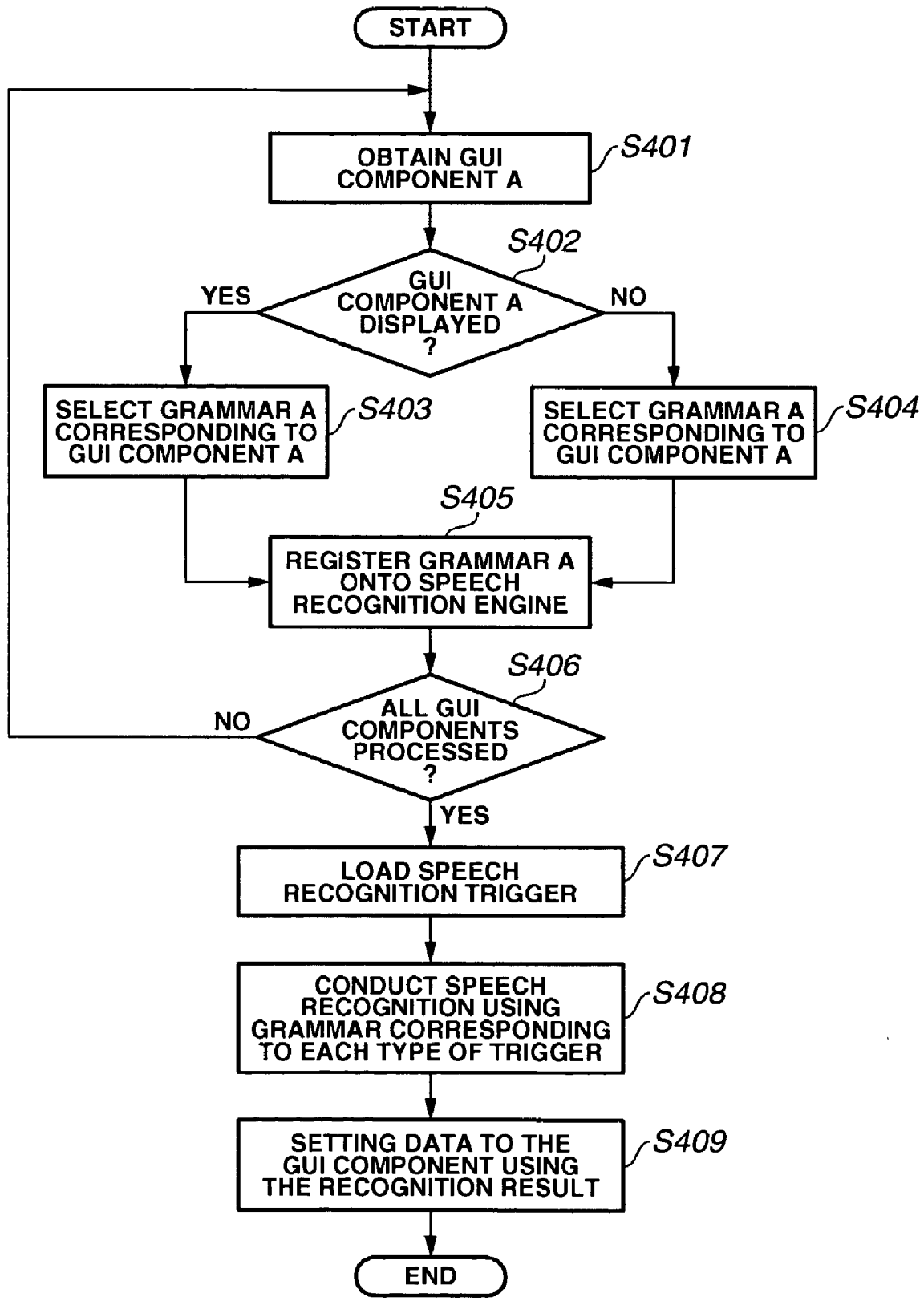
FIG. 4 is a process flow of an example information processing apparatus according to the second exemplary embodiment.

When a specific event such as a start of the speech input mode occurs, the process of the present invention is started and proceeds to the flow in FIG. 4. The flow will be described assuming that the GUI screen at this stage is in the state of the reference numeral 501. Since the processes in steps S401 to S403 are the same as those in steps S201 to S203, explanation on these is omitted.

Now referring to FIG. 4, after the non-displayed area grammar is selected by the non-displayed area grammar selecting unit (S404), the grammar becomes a grammar A corresponding to the GUI component A. The grammar A is registered onto the speech recognition engine by the speech recognition unit 107 (S405). Next, it is determined whether all of the GUI components have been processed (S406). If it is confirmed that all of the GUI components have been processed (YES at S406), the speech recognition trigger is loaded (S407). Otherwise, if not all of the GUI components have been processed (NO at S406), then the process returns to step S401. Next, speech recognition is conducted using grammar corresponding to each type of trigger (S408) and data is set to the GUI component using the recognition result (S409). Then the process ends.

Figure 9:
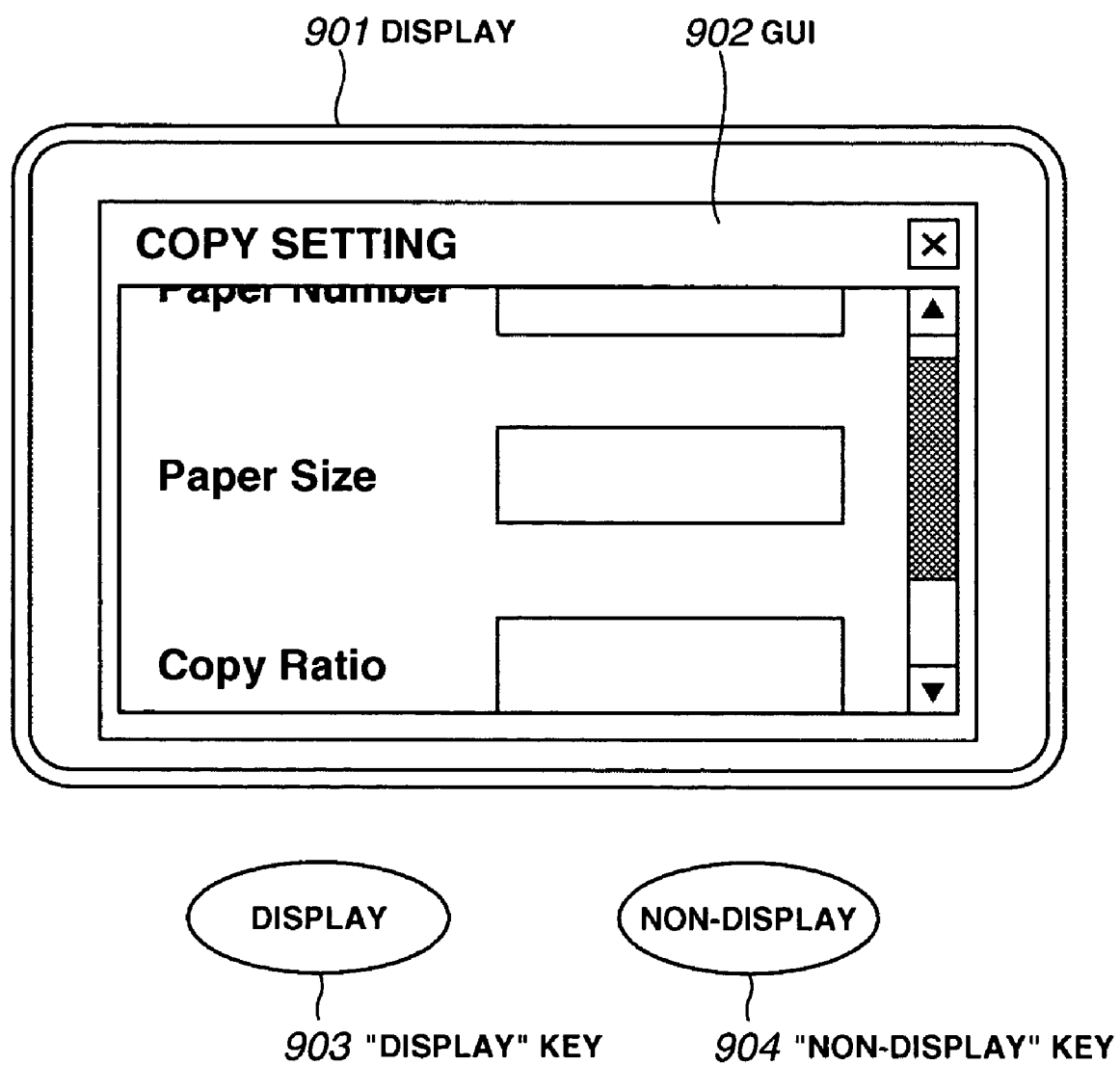
FIG. 9 is an example of a GUI screen of an information processing apparatus according to the second exemplary embodiment.

The speech recognition trigger is loaded from the speech recognition trigger loading unit 301 (see FIG. 3). A speech recognition trigger is an instruction unit configured to give an instruction to start speech recognition and is described before as the Push To Talk key. It is presumed that two Push To Talk keys indicated as "display" and "non-display" are provided as the devices that set off the speech recognition trigger. FIG. 9 illustrates a display 901 displaying a GUI 902. Further FIG. 9 shows an example of the keys, wherein reference numerals 903 and 904 denote the "displayed" key and the "not displayed" key respectively. In the case where the user speaks after depressing the "displayed" key, only the displayed area grammar among the speech recognition grammars registered in the speech recognition engine is used in conducting the speech recognition (S408). In the case where the user speaks after depressing the "non-displayed" key, speech recognition is conducted using only the non-displayed area grammar.

As described above, the user can designate by key input whether the speech is directed toward the area that is displayed or toward the area that is not displayed. The separation of the key contributes to a reduction of the recognition vocabulary in the speech recognition process and improves the recognition rate. In addition, the user can make a determination intuitively by separating the keys to "display" and "non-display".

Third Exemplary Embodiment

In the second exemplary embodiment, two Push To Talk keys indicated as "display" and "non-display" are used. This is just one example, and other keys or an event can be used as a trigger for starting the speech recognition. For example, it is possible to regard detection of speech without any depression of the key as a trigger for starting the speech recognition. By doing so, in the case where a key is depressed, speech recognition is conducted using the non-displayed area grammar, and in the case where the speech is detected without the key being depressed, speech recognition is conducted using the displayed area grammar.

As described above, the user becomes able to speak without depressing the Push To Talk key for the area currently displayed. On the contrary, it is also possible to conduct speech recognition using the displayed area grammar in the case where the key is depressed, and conduct speech recognition using the non-displayed area grammar in the case where speech is detected without the key being depressed.

Fourth Exemplary Embodiment

In the first exemplary embodiment, a speech recognition grammar corresponding to the displayed GUI component (displayed area grammar), and a speech recognition grammar corresponding to the GUI component which is not displayed and on which a limitation is placed (limited non-displayed area grammar), are used in the speech recognition. This can be combined with a plurality of triggers for starting speech recognition used in the second exemplary embodiment.

For example, in the case where two Push To Talk Keys indicated as "display" and "non-display" are used, and a user speaks after depressing the "display" key, speech recognition is conducted using only the displayed area grammar among the speech recognition grammars registered in the speech recognition engine. In the case where the user speaks after depressing the "non-display" key, speech recognition is conducted using only the limited non-displayed area grammar.

As described above, since the speech recognition vocabulary corresponding to the GUI component not displayed on the screen can be limited, an improvement in the speech recognition performance is expected. In addition, since the speech recognition grammar can be also limited by selecting the Push To Talk key, further reduction of the speech recognition vocabulary is expected.

Other Exemplary Embodiments

The object of the present invention can also be achieved by supplying to a system or an apparatus a storage medium storing the program code of the software which realizes the functions of the above exemplary embodiment, so that the computer (or CPU or MPU) of the system or the apparatus can retrieve and execute the program code stored in the storage medium.

In this case, the program code itself retrieved from the storage medium realizes the function of the above exemplary embodiment, and the storage medium that stores the program code can constitute the present invention.

Examples of the storage medium for supplying the program code are a flexible disk, hard disk, optical disk, magnet-optical disk, CD-ROM, CD-R, magnetic tape, nonvolatile memory card, and ROM.

Furthermore, in addition to realizing the functions of the above exemplary embodiment by executing the program code retrieved by a computer, the present invention includes also a case in which an operating system (OS) running on the computer performs a part or the whole of the actual process according to the instructions of the program code, and that process realizes the functions of the above exemplary embodiment.

Furthermore, the present invention includes also a case in which, after the program code is retrieved from the storage medium and loaded onto the memory in the function extension unit board inserted in the computer or the function extension unit connected to the computer, the CPU in the function extension board or the function extension unit performs a part of or the entire process according to the instruction of the program code, and that process realizes the functions of the above exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-191538 filed Jun. 30, 2005, which is hereby incorporated by reference herein in its entirety.

What is claimed:

1. An information processing method for setting data to each of a plurality of settable graphical user interface items, the method comprising:
   detecting a settable graphical user interface item not displayed on a display screen;
   selecting a speech recognition grammar corresponding to the detected item,
   wherein the selected speech recognition grammar is speech recognition grammar which is limited to a subset of the speech recognition grammar used in a case where the item is displayed;
   recognizing received speech information using the selected speech recognition grammar; and
   setting data to the detected item using a recognition result of the recognizing step.

2. The information processing method as according to claim 1, wherein the setting step sets data to the detected item by inputting the recognition result into an input field corresponding to the detected item.

3. The information processing method according to claim 1, wherein the setting step sets data to the detected item by selecting from objects to be selected that correspond to the detected item using the recognition result.

4. The information processing method as according to claim 1, wherein the selecting step selects a speech recognition grammar corresponding to a settable graphical user interface item displayed on a display screen, and wherein the recognizing step recognizes received speech information using a limited speech recognition grammar corresponding to the settable graphical user interface item not displayed and a speech recognition grammar corresponding to the displayed settable graphical user interface item.

5. The information processing method as according to claim 1, wherein the speech recognition grammar includes a recognition vocabulary corresponding to the detected settable graphical user interface item and a recognition vocabulary corresponding to data to be set to the detected item, and the limited speech recognition grammar is a speech recognition grammar in which a recognition grammar corresponding to data to be set to the settable graphical user interface item has been precluded from a recognition target.

6. The information processing method according to claim 1, wherein the limited speech recognition grammar is a speech recognition grammar in which a specific vocabulary set has been deleted.

7. An information processing method for setting data to each of a plurality of settable graphical user interface items, the method comprising:

recognizing received speech information using speech recognition grammar corresponding to a settable graphical user interface item which is not displayed in a case where an instruction from an instruction unit which instructs to start speech recognition makes a settable graphical user interface item not displayed on a display screen effective; and setting the settable graphical user interface item using a recognition result of the recognizing step.

8. An information processing method according to claim 7, wherein the speech recognition grammar corresponding to the settable graphical user interface item which is not displayed is speech recognition grammar which is limited to a subset of the speech recognition grammar used in a case where the settable graphical user interface item is displayed.

9. An information processing method according to claim 8, wherein the recognizing step recognizes received speech information using speech recognition grammar corresponding to a settable graphical user interface item which is displayed, in the case where an instruction from the instruction unit which instructs to start speech recognition, makes a settable graphical user interface item that is displayed on a display screen effective.

10. An information processing method according to claim 9, wherein the instruction unit which instructs to start speech recognition is a button, and wherein there are at least two buttons, one of which makes a settable graphical user interface item displayed on a display screen effective, and another of which makes a settable graphical user interface item which is not displayed on a display screen effective.

11. An information processing method as according to claim 9, wherein the instruction unit which instructs to start speech recognition is at least one of an instruction unit which instructs to start speech recognition upon detecting speech, and an instruction unit which instructs to start speech recognition upon detecting depression of a button.

12. A computer readable medium containing computer-executable instructions for setting data to each of a plurality of settable graphical user interface items, the medium comprising:

computer-executable instructions for recognizing received speech information using speech recognition grammar corresponding to a settable graphical user interface item which is not displayed in a case where an instruction from an instruction unit which instructs to start speech recognition makes a settable graphical user interface item not displayed on a display screen effective; and computer-executable instructions for setting the settable graphical user interface item using a recognition result of the recognizing step.

13. An information processing apparatus configured to set data to each of a plurality of settable graphical user interface item, the apparatus comprising:

a detecting unit configured to detect a settable graphical user interface item not displayed on a display screen;

a recognizing unit configured to recognize received speech information using a speech recognition grammar corresponding to a settable graphical user interface item which is not displayed in a case where an instruction from an instruction unit which instructs to start a speech recognition makes a settable graphical user interface item not displayed on a display screen effective; and a setting unit configured to set the detected item using a recognition result obtained by the recognizing unit.

* * * * *